United States Patent [19]

Turner et al.

[11] Patent Number: 5,256,873
[45] Date of Patent: Oct. 26, 1993

[54] MULTIPLE STATION THROUGH BEAM PHOTOELECTRIC SENSOR

[75] Inventors: Charles J. Turner, Milwaukee; Frank W. Camps, West Allis; Akbar Saffari, Milwaukee; Gregory L. Nadolski, Brookfield, all of Wis.

[73] Assignee: Eaton Corporation, Cleveland, Ohio

[21] Appl. No.: 940,130

[22] Filed: Sep. 3, 1992

[51] Int. Cl.⁵ .................................................. H01J 5/02
[52] U.S. Cl. .................................. 250/239; 250/561; 250/575
[58] Field of Search ............... 250/221, 222.1, 239, 250/561, 571, 573, 575, 576; 356/430, 436

[56] References Cited

U.S. PATENT DOCUMENTS

| | | | |
|---|---|---|---|
| 3,800,161 | 3/1974 | Scott et al. | 250/576 |
| 4,217,492 | 8/1980 | Fayfield | 240/239 |
| 4,412,129 | 10/1983 | Duncan | 150/239 |
| 4,678,253 | 7/1987 | Hicks, Jr. et al. | 439/210 |
| 4,727,248 | 2/1988 | Meur | 250/239 |
| 4,786,803 | 11/1988 | Majette et al. | 250/237 |
| 4,841,283 | 6/1989 | Bubliewicz | 250/222.1 |
| 4,975,062 | 12/1990 | Evans et al. | 439/13 |
| 5,003,169 | 3/1991 | Sakaguchi et al. | 250/239 |
| 5,130,556 | 7/1992 | Duncan et al. | 250/560 |

Primary Examiner—David C. Nelms
Assistant Examiner—S. B. Allen
Attorney, Agent, or Firm—L. G. Vande Zande

[57] ABSTRACT

Light emitting diodes of a through beam photoelectric detector are positioned in a door hinged to a sensor body in which the photodetector diodes are located. The light emitting diodes and photodetector diodes are aligned to establish photoelectric sensors when the door is closed upon the body. A base provides a receptacle for attachment of the sensor, the base having a plug-in electrical terminal half for receiving the connector prongs of a second half of the connector carried by the body. The connector is symmetrical so that the sensor unit may be installed to the base in either of two operating positions spaced 180 degrees apart to enable the hinge to be located at either the right-hand or left-hand side of the sensor unit and of the stations to be sensed. LED indicators for indicating the condition of the material being sensed at any of the stations are connected through printed circuitry to the connector half located within the base so that the indicators correspond to a particular sensing station regardless of the position of the sensor unit on the base.

16 Claims, 3 Drawing Sheets

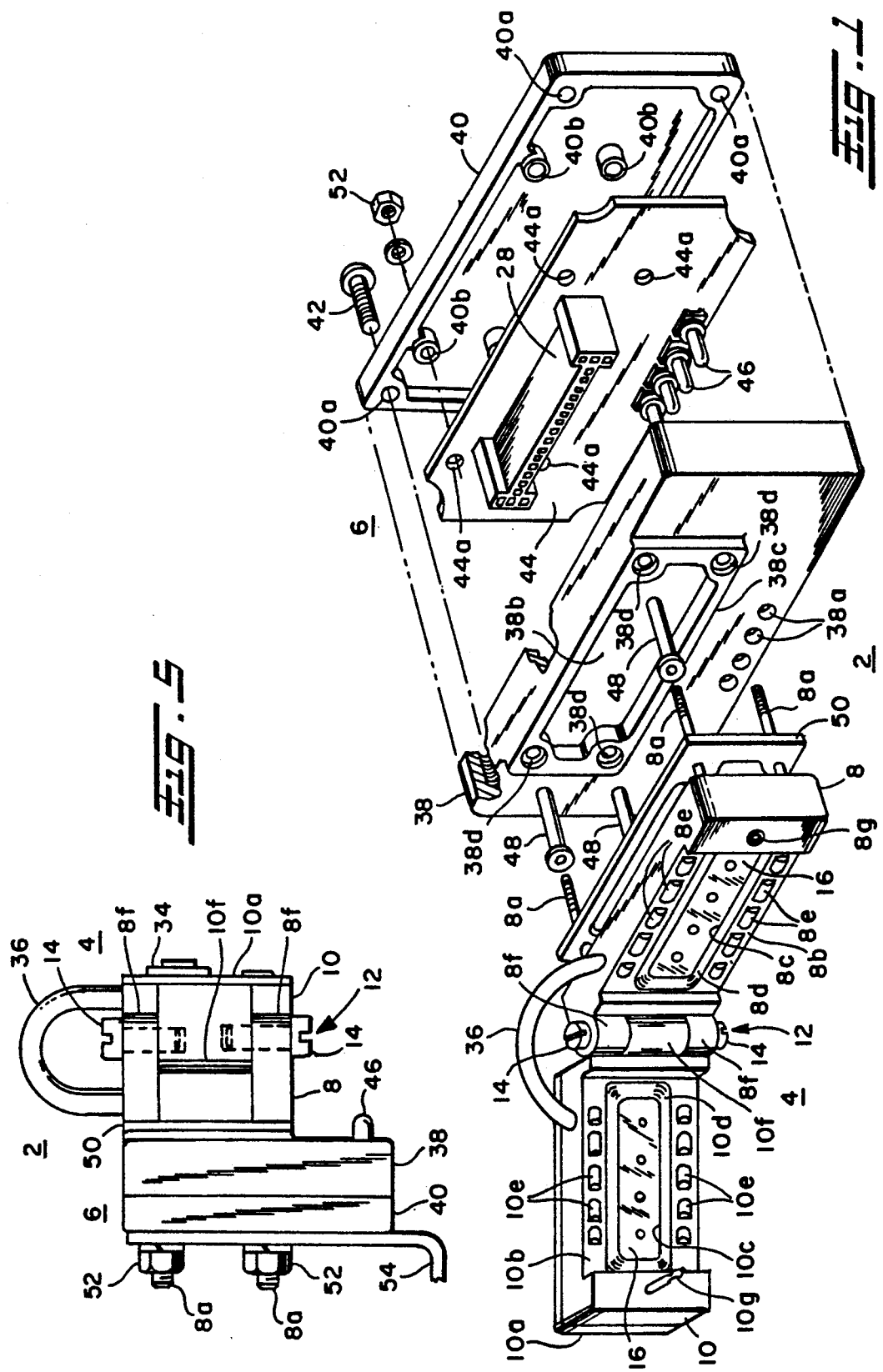

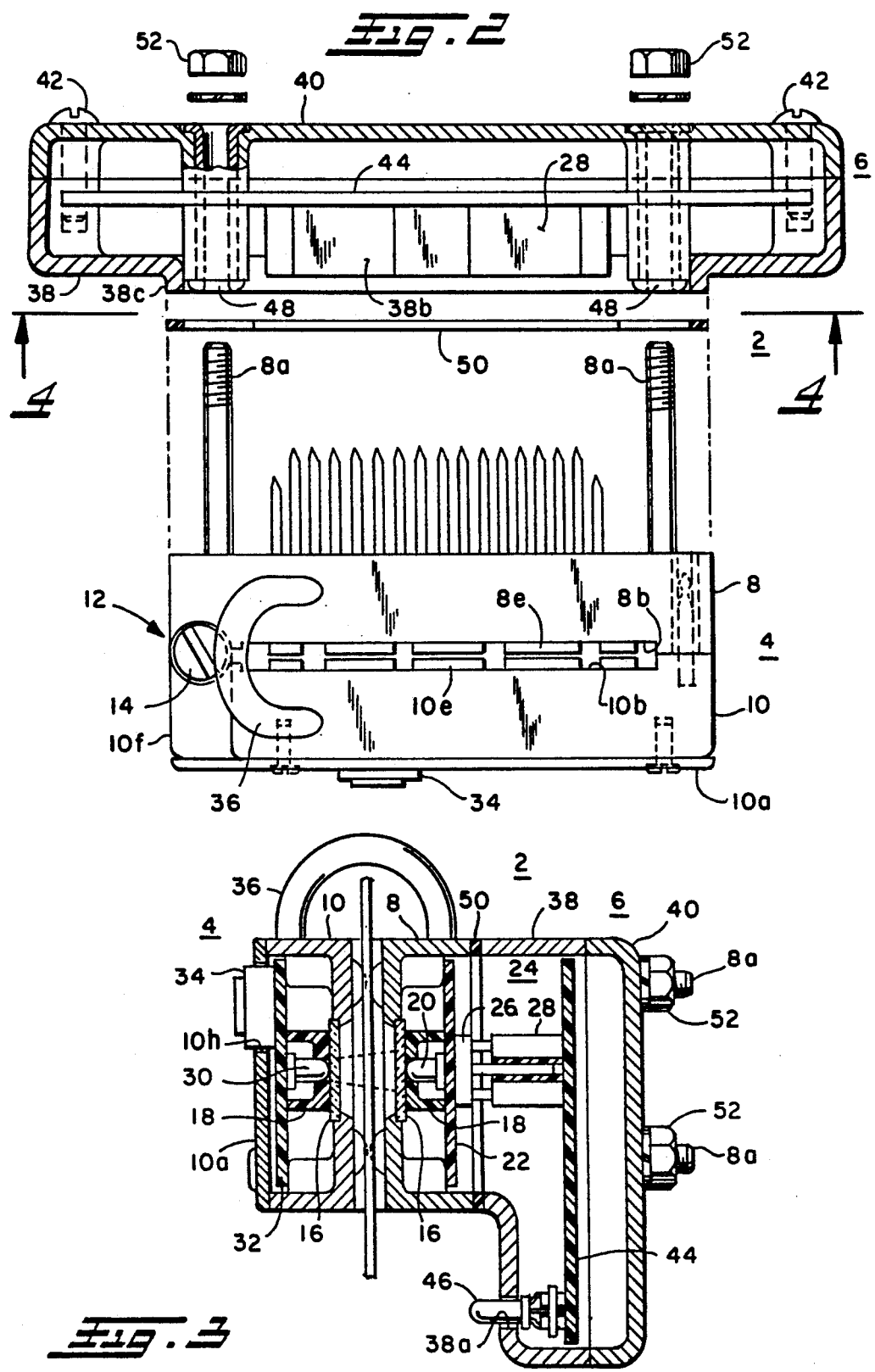

MULTIPLE STATION THROUGH BEAM PHOTOELECTRIC SENSOR

BACKGROUND OF THE INVENTION

This invention relates to photoelectric sensors and in particular to through beam photoelectric sensors. Still more particularly, the invention relates to through beam photoelectric sensors which are ganged together in a common housing.

The need for sensing and the use of sensors for monitoring conditions in manufacturing and processing functions is markedly increasing as the controls for such functions become more complex and rapidly responsive to changing conditions of the functions. As a result, manufacturing and processing apparatus incorporate a large number of sensor devices, often in small and remote locations within the apparatus. The size of individual sensors has been decreasing which enables them to be mounted in smaller spaces, but often the number of sensors which may be mounted within a given space is limited by the mounting hardware for the sensors. As a result, several sensors are mounted in a common housing for monitoring several sensing stations which are in close proximity to each other. For example, it may be desired to monitor the density of a liquid flowing in several closely spaced transparent conduits or to monitor the presence of absence or other condition of multiple strands of material, e.g. wire strands from a wire drawing apparatus or the like. In such applications where a through beam photoelectric sensor is used, it is often difficult to interrupt the material to be sensed when installing the sensing apparatus.

SUMMARY OF THE INVENTION

This invention provides a multiple station through beam photoelectric sensor which is particularly designed for monitoring materials at closely spaced sensing stations. It is also particularly well suited for installation to apparatus wherein the materials to be monitored travel in long reaches which are not easily interruptible for installation of the sensing apparatus. To this end, the sensor of this application comprises a separable housing wherein the light emitting elements of these photoelectric sensors are positioned in one of the members and the photodetecting elements of the sensor are disposed in the other of the members and the sensor is assembled around the material to be monitored. For ease in maintaining the electrical connections between the light emitting devices and the photodetector devices, the two housing members are hinged together and a flexible electrical conductor extends between the two housing members. Hinging the two members together also provides improved alignment between the respective light emitting devices and photodetectors as well as preventing loss of one of the members during installation or service.

For still greater flexibility in mounting the sensor to the apparatus, the hinged members of the sensor are mounted as a separable unit to a base and may be mounted in one of two operating positions rotationally spaced 180 degrees apart to enable the hinge to be located at either side of the sensing stations at which the material to be monitored is located. The sensor unit and the base each comprise one portion of a plug-in electrical connector to facilitate connecting the sensor unit to the base which is connected to the control system for the manufacturing or processing apparatus. The plug-in connector portion associated with the base is preferably symmetrical about a center point to receive the plug-in connector portion of the sensor unit in either of the two operating positions. In a preferred embodiment, the sensor base is provided with a plurality of indicator devices which correspond to the respective sensing stations and are not dependent upon the particular operating position of the sensor unit. These and other features of the invention will become more readily apparent when reading the following description in conjunction with the accompanying drawings.

BRIEF DESCRIPTION OF THE DRAWINGS

FIG. 1 is an exploded isometric view of the multiple station through beam photoelectric sensor of this invention;

FIG. 2 is a top plan view of the photoelectric sensor of FIG. 1 shown partially exploded and partially in cross section;

FIG. 3 is a cross sectional view through substantially the center of the assembled multiple station through beam photoelectric sensor of this invention;

FIG. 5 is an end elevational view of the photoelectric sensor of this invention taken from a hinged end of the sensor.

DETAILED DESCRIPTION OF THE PREFERRED EMBODIMENT

Figure 4:
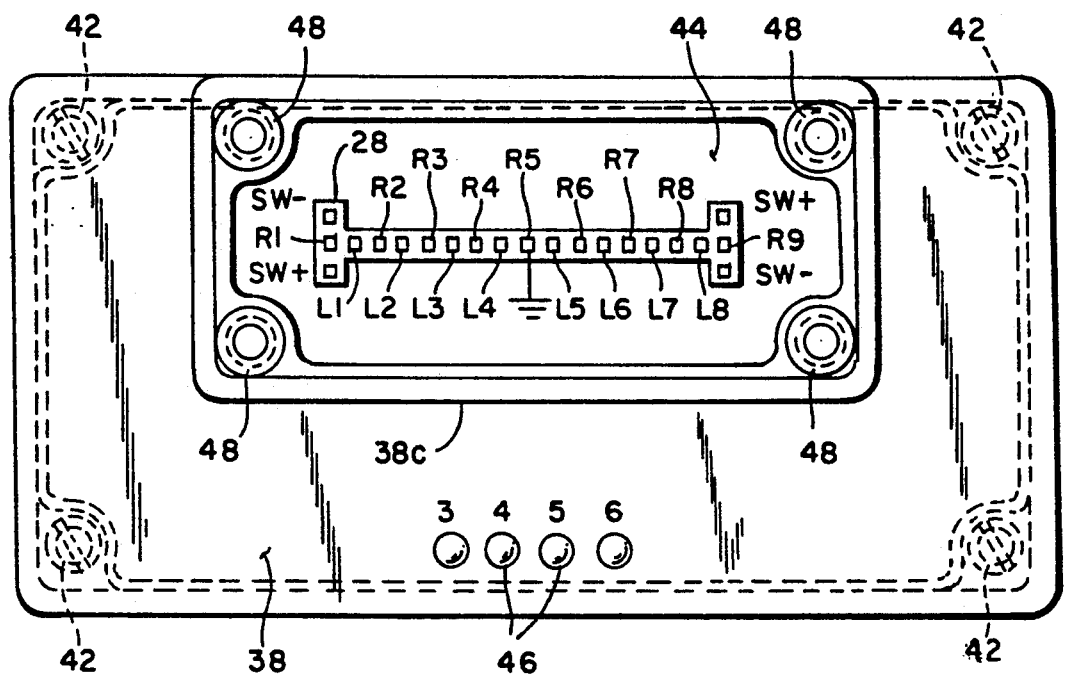
FIG. 4 is a front elevational view of the base of the photoelectric sensor of this invention with the sensing unit removed therefrom.

The multistation through beam photoelectric sensor 2 of this invention comprises a sensor unit 4 which is detachably mounted to a base 6 in one of two operating positions rotationally spaced 180 degrees. Sensor unit 4 comprises a body 8 and a cover 10 joined together at one end by a hinge 12. Body 8 is a hollow rectangular shaped housing element open to the back side thereof and having four rearwardly extending threaded studs 8a located at the respective corners. The forward face of body 8 is relieved at 8b and has a central opening 8c surrounded by a beveled transition surface 8d extending between the opening 8c and the recessed surface 8b. Guide means such as molded projections 8e may be provided on surface 8b for assisting in the alignment of the material to be sensed. One end of sensor body 8 is provided with a pair of hinge arms 8f located along the top and bottom edges of the body, the arms having holes extending therethrough and axially aligned from top to bottom as oriented in the drawings.

Cover 10 is a hollow housing member having a cover 10a secured over an open forward side thereof by fastener means such as screws (not shown). The rearwardly oriented surface of cover 10 is relieved at 10b similar to surface 8b of body 8. Surface 10b also has a central aperture 10c and a surrounding beveled transition surface 10d. Guides 10e may be provided on surface 10b if desired to cooperate with the guides 8e in providing positioning or guiding means for the material to be monitored. A boss 10f is provided at one end of cover 10 disposed centrally between the upper and lower surfaces thereof. While not specifically shown, boss 10f has threaded holes coaxially aligned in the upper and lower surfaces thereof. Cover 10 is attached to body 8 by inserting boss 10f between arms 8f and securing shouldered screws 14 through the holes in arms 8f and threading them into the tapped holes of boss 10f. Thus cover 10 is hinged to body 8 for swinging open and closed upon the body 8. A latch 10g on cover 10 engages a corresponding latch receptacle 8g on body 8 to releasably retain the cover 10 closed upon the body 8.

The sensor shown in the drawings has four individual photoelectric sensors spaced in the sensor unit housing at intervals corresponding to the stations at which sensing is desired. The sensor unit of this invention can accommodate as many as eight individual photoelectric sensors in even groups of two, i.e. four, six or eight. Where more than four sensing stations are required, the arrangement of the guides 8e and 10e is necessarily modified. A piece of transparent glass or plastic 16 is placed over the respective aperture 8c and 10c in the body and cover to close off the respective aperture. A mounting block 18 is provided for both the body and the cover, the block being a long shallow U-shaped channel having four holes spaced along and extending through the bight portion. The number of holes corresponds to the number of sensing stations that the sensor 2 is intended to accommodate. Four photodetector diodes 20 or the like are cemented in place within the respective holes of the mounting block 18 which is located in the body 8 of the sensor unit 4. When the photodetector diodes 20 are firmly secured in place by the adhesive, the block 18 and diodes 20 are secured to a printed circuit board 22 by soldering the leads of the diodes 20 to the circuit board. One portion 26 of a plug-in electrical connector 24 is attached to the rear surface of printed circuit board 22 and electrically connected to appropriate traces on the circuit board for joining the leads of the photodetector diodes 20 to the respective plug-in prongs of the connector 24. Printed circuit board 22 and the assembled elements are positioned within the open back side of body 8 such that the bight of guide block 18 is positioned against the back side of window 16 with the circuit board 22 resting against projections within the housing body 8. The hollow cavity of housing member 8 is then filled with an epoxy resin (not shown) to secure the electronic assembly in place within the sensor body and to close off the back side of the sensor body.

The guide block 18 which is used in cover 10 also has four holes therein in correspondence with the holes provided in the other guide block 18 used in body 8. A plurality of light emitting devices such as light emitting diodes (LEDs) 30 are secured in the holes by an adhesive. The wire leads of the diodes 30 are soldered to the appropriate traces of a printed circuit board 32. A snap action pushbutton reset switch 34 is attached to printed circuit board 32 at the opposite side from diodes 30. The assembly is positioned within the hollow housing of cover 10 such that the bight portion of guide block 18 abuts the inside of window 16 and circuit board 32 rests against appropriate projections within the cover 10. Switch 34 extends through a hole 10h in cover plate 10a which is secured to the cover housing 10 by the screws (not shown) after the electronic assembly is assembled thereto. Light emitting diodes 30 are aligned with and disposed across the space provided by recessed surfaces 8b and 10b from photodetector diodes 20 to form four photoelectric through beam sensors. A multiple conductor flexible cable 36 extends through openings in sensor body 8 and cover 10 and extends therebetween to connect the printed circuit board 32 with respective traces on printed circuit board 22 and subsequently to appropriate pins on the plug-in connector portion 26.

The base 6 comprises a front housing member 38 and a rear housing member 40 which are secured together by screws 42 which extend through holes 40a at the four corners of rear housing member 40 to take into aligned blind tapped holes open rearwardly in front housing member 38. Base housing members 38 and 40 serve to mount an electronic printed circuit board 44 therebetween. Printed circuit board 44 has another portion 28 of plug-in connector 24 bonded to a forward surface thereof. Connector portion 28 is actually a plurality of multiple socket connector portions bonded to the printed circuit board 44 in a particular pattern which is symmetrical about a center point thereof. The sockets of the respective connector elements are electrically connected to appropriate traces on the printed circuit board 44. Four light emitting diodes (LEDs) 46 are mounted on the lower front surface of printed circuit board 44 and electrically connected to appropriate traces thereon. The four LEDs 46 correspond to the respective sensing stations of the sensor 2. Housing 38 is provided with four holes 38a along its lower edge through which the respective LEDs 46 project to be visible to the exterior of the sensor housing.

The forward housing member 38 is also provided with an aperture 38b defined by a peripheral flange 38c which corresponds in profile to the rear surface of sensor body 8. Flange 38c has holes 38d extending therethrough at the four corners in alignment with studs 8a. Four tubular rivets 48 are inserted through the holes 38d and aligned holes 44a in printed circuit board 44 to project through holes 40b in rear housing member 40 and are turned over at the external surface of rear housing member 40 to further secure housing members 38 and 40 together and to positively position printed circuit board assembly 44 within the base housing. If desired, screws 42 and the appropriate holes 40a and the blind tapped holes in housing 38 may be omitted and the housing members 38 and 40 held together solely by the tubular rivets 48. Although not shown, a flexible cable conductor is attached to printed circuit board 44 and brought out externally from base 6 for connecting the sensor 2 to external control apparatus. Also not shown are other electrical components and circuitry of the printed circuit board 44 which are not material to this invention.

Referring to FIG. 4, the plug-in connector portion 28 mounted on printed circuit board 44 and disposed within the opening 38b comprises an elongated row of an odd number of sockets. The center socket is a ground connection whereas alternate sockets working outward from the center socket are light emitting device sockets and photodetector sockets, respectively. The opposite ends of the connector 28 have a single socket on either side of the center row, forming a three socket vertical row as oriented in the drawings. These are positive and negative power connection sockets which are diagonally the same polarity. Accordingly, sensor unit 4 may be attached to base 6 by inserting studs 8a through tubular rivets 48 and pushing the pins of plug-in connector element 26 into the sockets of plug-in connector element 28 such that the ends of studs 8a project beyond the rear surface of rear housing member 40 of base 6. A gasket 50 is interposed between the rear surface of sensor unit 4 and the flange 38c of housing member 38 to seal the joint therebetween. Nuts 52 secure the sensor unit 4 to the base 6 and serve as a convenient means of attaching a mounting bracket 54 to the sensor.

When sensor unit 4 is so attached to base 6, electric power is supplied from base 6 through the plug-in connector 24 to the photodetector diodes 20 and by means of the flexible conductor 36, to the light emitting diodes 30. Output signals of photodetector diodes 20 are also transmitted to the printed circuit board 44 through the plug-in connector 24. The material M to be monitored (FIG. 3) is disposed at each sensing station between the cover 10 and body 8 of the sensor unit 4 and extends through the beam of light emitted from LED 30 to photodetector diode 20. In the event the material M is not present or its condition changes, such as the density of a liquid in a conduit or the thickness of the material M, the photodetector 20 will receive more or less light and will emit an appropriate electric signal. The LED indicator 46 corresponding to that station will preferably be illuminated (or will be extinguished if the indicators are preferred to be illuminated initially) to indicate a potential problem at that particular station.

The sensor unit 4 may be installed to base 6 as shown in the drawings with the hinge 12 located to the left of the sensor unit and sensing stations, or the sensor unit may be rotated 180 degrees and then installed to base 6 with the hinge 12 located to the right of the various sensor stations so that the door 10 opens to the right. The symmetrical plug-in connector element 28 allows the sensor unit 4 to be rotated 180 degrees such that the hinge 12 is located on the right-hand end and then attached to the base. The symmetry of the connector 28 permits LEDs 30 and photodetectors 20 of the sensor unit 4 to be connected to sockets associated with a respective sensing station, even though the particular LEDs and the photodetectors are not the identical members as were received in those sockets when the sensor unit 4 was installed with the hinge 12 on the left. Thus the sockets of connector element 28, the circuitry and traces on printed circuit board 44 and the indicators 46 are dedicated to particular respective sensing stations, while the respective light emitting diodes 30 and the photodetectors 20 are not sensitive to any particular sensing station.

The hinged structure of the sensor unit 4 facilitates mounting the sensor 2 to apparatus. As described hereinabove, the door 10 can be made to open either right or left depending upon the orientation of sensor unit 4 upon base 6. The ability of the door to open allows the sensor 2 to be positioned to apparatus after the material M to be sensed is in place, or facilitates replacing the material during operation. Moreover, if the sensor requires service, a complete sensor unit 4 may be removed from base 6 and a new unit 4 attached thereto in little time. While the multistation through beam photoelectric sensor of this invention has been disclosed in a single preferred embodiment, it is to be understood that it is susceptible of various modifications without departing from the scope of the appended claims.

We claim:

1. A multiple station through beam photoelectric sensor comprising:
    a sensor housing comprising a plurality of through beam photoelectric sensor units mounted at spaced locations in said housing, said locations corresponding to stations at which sensing is required, and one portion of plug-in electrical connector means electrically connected to said sensors;
    a base comprising a mating portion of said plug-in electrical connector means and electric circuit means electrically connected to said mating portion for transmitting electric power to and receiving electric signals from said sensors through said plug-in connector means; and
    means for attaching said sensor housing to said base in a selected one of two operating positions rotationally spaced 180 degrees, said mating portion of said electrical connector means being plugged into said one portion of said connector means in each of said two operating positions.

2. The multiple station through beam photoelectric sensor defined in claim 1 wherein said base comprises a plurality of indicator means electrically connected to said circuit means in fixed correspondence to particular said stations for indicating a sensed condition at a particular said station irrespective of said operating position of said sensor housing to said base.

3. The multiple station through beam photoelectric sensor defined in claim 2 wherein said sensor housing comprises:
    a body member;
    a door member; and
    hinge means hingedly mounting said door to said body at one side of said stations, said door being swingable between open and closed positions on said body across said stations, said hinge means being located at an opposite side of said stations when said sensor housing is attached to said base in an other of said two operating positions.

4. The multiple station through beam photoelectric sensor defined in claim 3 wherein said photoelectric sensor units each comprise a light emitting device and a photodetector device arranged on opposite sides of a sensing zone at a respective said station, one of said devices being mounted in said door member and an other of said devices being mounted in said body member.

5. The multiple station through beam photoelectric sensor defined in claim 4 wherein a space is provided between said door and said body at each station when said door is closed upon said body for receiving a means being sensed, said sensing zone being in said space.

6. A multistation through beam photoelectric sensor comprising:
    a base comprising electronic means and one portion of a plug-in electrical connector connected to said electronic means;
    a sensor housing comprising a plurality of light emitting devices and photodetectors arranged in cooperating pairs defining a plurality of through beam photoelectric sensors at spaced locations along said housing corresponding to sensing stations, and a mating portion of said plug-in electrical connector connected to respective said light emitting devices and photodetectors; and
    means for attaching said sensor housing to said base in one of two operating positions, said operating positions being rotationally spaced 180 degrees, and said mating portion of said plug-in connector being operably plugged into said one portion of said plug-in connector in each of said operating positions for transmitting electric power to said light emitting devices and photodetectors from said electronic means and for transmitting electric signals from said photodetectors to said electronic means.

7. The multistation through beam photoelectric sensor defined in claim 6 wherein said base comprises a plurality of externally visible indicator means electrically connected to said electronic means in fixed correspondence to particular said stations for indicating a sensed condition at a particular said station in either operating position of said sensor housing on said base.

8. The multistation through beam photoelectric sensor defined in claim 7 wherein said sensor housing comprises:
- a body having one of said plurality of light emitting devices and photodetectors mounted therein;
- a door having an other of said plurality of light emitting devices and photodetectors mounted therein;
- hinge means pivotally mounting said door to said body at one side of said stations, said door being pivotally movable between an open position and a position closed upon said body wherein respective said light emitting devices and photodetectors are aligned; and
- flexible conductor means extending between said body and said door for electrically connecting said other of said plurality of light emitting devices and photodetectors to said mating portion of said plug-in electrical connector;
- wherein said hinge means is located at an opposite side of said stations when said sensor housing is attached to said base in an other of said two operating positions.

9. The multistation through beam photoelectric sensor defined in claim 8 wherein space is provided between said door and said body at each station when said door is closed upon said body for receiving a means being sensed.

10. A multistation through beam photoelectric sensor comprising:
- a base having an internal cavity and an opening communicating with said cavity;
- electronic circuit means mounted in said cavity;
- one portion of a plug-in electrical connector positioned within said opening and connected to said electronic circuit means;
- a sensor body comprising a mating portion of said plug-in electrical connector mountable to said base over said opening in a selected one of two operating positions, said operating positions being rotationally spaced 180 degrees apart, and said mating portion being plugged into said one portion of said electrical connector in each of said operating positions;
- a door pivotally mounted to said sensor body by hinge means disposed at one side of said sensor body;
- a plurality of light emitting devices mounted at spaced locations in one of said sensor body and said door;
- a plurality of photodetector devices mounted at spaced locations in the other of said sensor body and door, said devices being disposed in aligned relationship when said door is closed upon said body for defining photoelectric sensors at spaced locations corresponding to stations at which sensing is required.

11. The multistation through beam photoelectric sensor defined in claim 10 further comprising:
- indicator means disposed in said base cavity and visible externally of said base, said indicator means being electrically connected to said electronic circuit means in fixed correspondence to particular said stations for indicating a sensed condition at a particular said station in each operating position of said sensor body on said base.

12. The multistation through beam photoelectric sensor defined in claim 11 wherein said one portion of said plug-in electrical connector is symmetrical about a center thereof.

13. The multistation through beam photoelectric sensor defined in claim 11 wherein said plurality of light emitting devices are mounted in said door, and further comprising flexible conductor means extending between said door and said body for electrically connecting said light emitting devices to said mating portion of said plug-in electrical connector.

14. The multistation through beam photoelectric sensor defined in claim 13 wherein a respective said light emitting device is spaced from a respective aligned photodetector device when said door is closed upon said body for defining a sensing zone at a respective station, and said means to be sensed is disposed in said sensing zone.

15. The multistation through beam photoelectric sensor defined in claim 14 wherein said door and said body provide a space therebetween when said door is closed on said body for receiving said means to be sensed therebetween.

16. The multistation through beam photoelectric sensor defined in claim 10 wherein said hinge means disposed at one side of said sensor body is disposed at one side of said stations in one operating position of said sensor body on said base and is disposed at an opposite side of said stations in an other of said operating positions of said sensor body on said base.

* * * * *